United States Patent [19]

Helf

[11] Patent Number: 4,995,030
[45] Date of Patent: Feb. 19, 1991

[54] FAR END ECHO CANCELLATION METHOD AND APPARATUS

[75] Inventor: Brant M. Helf, Newtonville, Mass.

[73] Assignee: Memotec Datacom, Inc., North Andover, Mass.

[21] Appl. No.: 431,713

[22] Filed: Nov. 2, 1989

Related U.S. Application Data

[63] Continuation of Ser. No. 150,975, Feb. 1, 1988, abandoned.

[51] Int. Cl.⁵ .............................................. H04B 3/20
[52] U.S. Cl. .................................... 370/32.1; 379/410
[58] Field of Search .............. 364/224.1; 370/32, 32.1; 379/406, 410, 411; 375/118

[56] References Cited

U.S. PATENT DOCUMENTS

| | | |
|---|---|---|
| Re. 31,253 | 5/1983 | Weinstein . |
| 4,074,086 | 2/1978 | Falconer et al. ..................... 379/410 |
| 4,087,654 | 5/1978 | Mueller . |
| 4,355,406 | 10/1982 | Guidoux .............................. 375/82 |
| 4,464,545 | 8/1984 | Werner . |
| 4,481,622 | 11/1984 | Cheng et al. ......................... 370/30 |
| 4,527,020 | 7/1985 | Ito ...................................... 379/410 |
| 4,535,206 | 8/1985 | Falconer . |
| 4,571,465 | 2/1986 | Brie et al. . |
| 4,613,731 | 9/1986 | Godard . |
| 4,615,025 | 9/1986 | Vry ..................................... 370/32 |
| 4,682,358 | 7/1987 | Werner .............................. 379/411 |

Primary Examiner—James L. Dwyer
Attorney, Agent, or Firm—Hale and Dorr

[57] ABSTRACT

A full duplex communications apparatus, having at each of a plurality of modem stations a transmitter and a receiver circuitry communicating with a two-wire system, receives signals having both a noise free signal component and a noise signal component. The noise signal component includes a far end echo signal which tends to corrupt and distort the received signal hence increasing the error rate. A method and apparatus for reducing the effect of the far end echo signal at the receiver, in particular a receiver using quadrature detection and equalization circuitry, provide a far end echo cancellation circuitry responsive to error signals generated by the receiver decision circuitry. The cancellation circuitry uses a synchronized reference signal from the transmitter of the station. The echo cancellation circuitry output signals are linearly combined with the output of the equalization circuitry (operating on the received signal) and the resulting equalized and compensated signal output is delivered to the receiver detection circuitry. The far end echo cancellation signal circuitry operates in parallel with the receiver equalization circuitry. The reference signal applied to the echo cancellation circuitry is derived from the transmitter at the station and is synchronized to the received clock signals. That received signal is typically different in both frequency and phase from the transmitter signal and digital domain processing is advantageously provided for generating the reference signal. Alternatively, a more expensive analog approach for generating the reference signal can be employed.

19 Claims, 5 Drawing Sheets

FAR END ECHO CANCELLATION METHOD AND APPARATUS

This is a continuation of application Ser. No. 150,975 filed Feb. 1, 1988 now abandoned.

BACKGROUND OF THE INVENTION

The invention relates generally to communications systems and methods and, in particular, to a method and apparatus for canceling far end echo in a full duplex modem communications system.

A typical modem communications system has a plurality of stations, each of the stations having a modem. The modem has separate transmitting and receiving sections. Each modem is typically a two wire unit and, when the two wire connection reaches the telephone switching office, the signals are converted to a four wire system. The connection from the modem connected two-wire to the telephone switching office four-wire system is designated a near end connection while the connection from the switching system back to the two-wire path connecting to the remote modem is designated a far end connection. It is well known that there results, from the two-to-four and four-to-two wire conversions, a noise in the form of echoes which travel along the communication path and which distorts, and thereby causes errors to occur in, the signal reception process.

It is further well known that the echo resulting from the modem near end boundary as a result of a signal transmitted by the transmitter, the received near end echo, is, to a very good approximation, a linear function of the transmitted signal and is combined additively by the telephone line with the desired signal coming from the other modem to form a "composite" received signal. This echo is not affected by and does not exhibit frequency translation or phase jitter. Thus the received near end echo can be eliminated by linearly and adaptively filtering the transmitted signal and subtracting that adaptive filter output from the composite signal.

The echo returning from the far end boundary, as a result of a transmission by the transmitter of the modem, also distorts the signal received at the modem from a remote transmitter source. The received far end echo, however, is subject to both frequency and phase variations. And, while the far end echo received by a receiver is usually a small signal relative to the desired received signal, it nevertheless is often large enough that reliable reception is impossible if the far end echo signal is not canceled. When the far end echo is affected by frequency or phase variations, it is difficult to adjust a conventional echo canceler with sufficient speed and accuracy to effectively cancel the far end echo.

The conventional approach to canceling the far end echo contemplates subtracting an echo cancellation signal from the signal received from the two wire telephone line to produce a corrected, hopefully echo-free, receiver signal which is then processed by the receiver. The corrected signal is typically also employed by the feedback loop as an error update signal to adjust an adaptive linear filter which produces the cancellation signal from delayed samples of the transmit signal. The feedback loop error update signal, however, has a large "real receiver" signal and a relatively small echo signal. The relatively large "real receiver" signal to a large extent masks the desired error signal, that is, the remaining far end echo present on the line. As a result, adaptation of the echo canceler may not be sufficiently fast or accurate to track changes resulting from frequency translation and other phenomena.

To improve the echo cancellation signal generation process, various references use transversal filtering methods including signal rotation in connection with quadrature detection and equalization. The references also describe using the output of the decision threshold circuitry for controlling the transversal filtering process in generating the echo cancellation signal. Even so, however, the result of the echo cancellation circuitry has not been satisfactory.

An object of the invention is therefore an improved far end echo cancellation method and apparatus. Further objects of the invention are a method and apparatus for providing a representation of the transmitter output signal of a full duplex modem synchronized to the receiver's timing reference for use in canceling the far end echo signal mixed with the true receiver input signal. Other objects of the invention are a method and apparatus for effecting synchronization of the transmitter output samples to the receiver samples (even when neither modem is in loop-back timing), and for providing such synchronization without using an analog interpolation filter, and for employing threshold decision outputs from a receiver decision circuitry for controlling the phase and amplitude of a far end echo cancellation signal.

SUMMARY OF THE INVENTION

The invention relates generally to a full duplex communication apparatus having at least two communicating modem stations. Each station has a transmitter for placing transmitted communications signals onto a two-wire communications path and a receiver for receiving received communications signals from the communications path. The received communications signal at the station has noise-free signal component and a noise signal component. The noise signal component includes a far end echo signal generated and correlated to the transmit signals of the station. The apparatus reduces and preferably cancels the effect of the far end echo signal at the receiver.

The apparatus features a quadrature detection and equalization circuitry for generating from the received signals an I and a Q equalized receiver signal; receiver decision circuitry responsive to a compensated I and Q equalized receiver signal for generating a receiver decision and for generating an I and a Q error update signal; a far end echo compensation circuitry responsive to the I and Q error update signals and to a reference signal from the transmitter of the station for generating an I and a Q far end echo cancellation signal; and circuitry for combining the I and Q echo cancellation signals with the I and Q equalized receiver signals for generating the compensated I and Q equalized receiver signals for delivery to the receiver decision circuitry. Preferably, the far end echo compensation circuitry includes a far end echo cancellation phase locked loop rotation element that rotates, in response to the compensated I and Q equalized receiver signals and a receiver decision, echo canceler I and Q signals to compensate for frequency translation in the far end echo signals.

In particular embodiments of the invention, the apparatus further features synchronization circuitry for generating the reference signal from transmitter signals generated at a transmitter clock rate, and providing a reference signal synchronized to the receiver operating at a receiver clock rate different than the transmitter clock rate. The receiver clock rate is synchronized to the received communications signals.

In a particular aspect, the synchronization circuitry features circuitry responsive to the receiver clock signal for digitally filtering a version of the transmitter signal synchronized to the transmitter clock rate and producing a version of the transmitter signal synchronized to the receiver clock rate. In this aspect, the apparatus provides circuitry for adjustably interpolating between samples of the transmit signal for generating the reference signal for the far end echo compensation circuitry. This procedure produces a reference signal in substantial synchronization to the receiver clock sample signal and also allows for transmitting signal samples synchronized to the received signal samples even when the transmitter clock rate is not synchronized to the receiver baud rate.

In another aspect of the invention, a method for reducing the effect of far end echo signals at the receiver features the steps of quadrature detecting and equalizing the received signals for generating from the received signals an I and a Q equalized receiver signal; generating a receiver decision and an I and a Q error update signal from compensated I and Q equalized receiver signals; generating an I and a Q far end echo cancellation signal in response to the I and Q error update signals and a reference signal generated from the transmitter output of the station; combining the I and Q echo cancellation signals and the I and Q equalized receiver signal for generating, respectively, the compensated I and Q equalized receiver signals for delivery to the receiver decision circuitry.

In other aspects, the method further features generating the reference signal from the transmitter operating at a first clock rate, the reference signal being synchronized to the receiver operating at a receiver clock rate which is different than the first clock rate of the transmitter. The receiver clock rate is synchronized to the received communications signals. The reference signal generating step further features digitally filtering and upsampling a transmitter output signal corresponding to the transmit communications signals, at virtually any desired sampling phase or frequency corresponding to the clock signals, and in particular at a sample frequency corresponding to the receive clock rate. In this aspect, the generating step further features the step of interpolating between sample outputs resulting from the filtering and upsampling step for providing a sampled output value of the transmit signal which is in substantial synchronization with the receiver clock signal.

In yet another aspect of the invention, an apparatus generates, in the digital domain, a transmit sample signal in synchronism with a received signal clock. This occurs in a communications system having at least two communicating modem stations. Each modem station has a transmitter for placing transmit communications signals onto a communications path at a transmitter baud rate and a receiver for receiving received communications signals from the communications path at a baud rate different than the transmitter baud rate. The apparatus features digital synchronization circuitry which receives as its input digital data signals from the transmitter at a clock rate derived from the baud rate of the transmitter and which provides a synchronized reference signal to the receiver at the received signal baud rate.

In other aspects of the invention, the synchronization circuitry features circuitry for digitally filtering and upsampling the digital data to a sample frequency substantially greater than the received signal clock and circuitry for interpolating between sample outputs of the filtering and upsampling circuitry for providing a sampled value of the digital data signals as the reference signal in synchronization with the received signal baud rate.

In another aspect, the method of the invention for generating a transmit sample signal, in the digital domain and in synchronism with the received signal, includes the step of digitally generating the transmit sample signal from transmitter signal data available at a clock rate derived from the transmitter baud rate and synchronizing the transmit sample signal to the received signal clock. In particular aspects of the method of the invention, there are featured the steps of digitally filtering and upsampling the transmitter sample signal to a sample frequency substantially greater than the received signal clock and interpolating between sample outputs of the filtering and upsampling step to provide a sampled value of the digital data signals in synchronism to the received signal baud rate.

BRIEF DESCRIPTION OF THE DRAWINGS

Other objects, features, and advantages of the invention will be apparent from the following description taken together with the drawings in which.

DESCRIPTION OF PARTICULAR PREFERRED EMBODIMENTS

Figure 1:
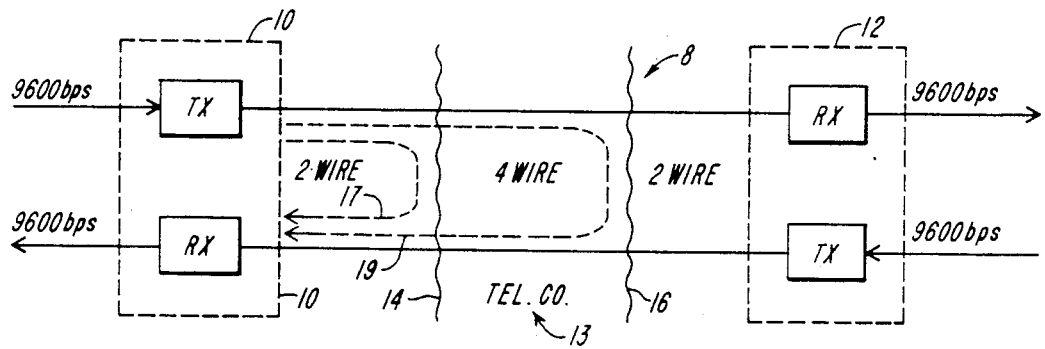
FIG. 1 is a general block diagram of a two station full duplex modem communication system.

Referring to FIG. 1, a communications system and network 8 has a plurality of modem stations including an illustrated local transmitter/receiver modem combination 10, and a remote transmitter/receiver modem combination 12. Each modem has separate receiving and transmitting circuitries, Rx and Tx, respectively. The modems are two-wire units. When the two-wire connection reaches a telephone switching office 13, the two-wire system signals are converted to a four-wire system. The telephone office connection is illustrated by a boundary 14 for the connection from modem 10 to the telephone switching office, a so-called near end connection for modem 10, and a boundary 16, a so-called far end connection for modem 10. As a result of the two-to-four and four-to-two wire conversions, a transmitted signal from the transmitter of modem 10 produces noise in the form of echoes 17 and 19 at each of connection boundaries 14 and 16 respectively. The echo resulting from the near end boundary 14, as a result of a signal transmitted by the transmitter of modem 10, is a near end echo 17 which has no frequency or phase translation. The near end echo corrupts the signal received by the receiver of modem 10 from, for example, the transmitter of modem 12. The near end echo 17 received at modem 10 is a linear function of the signal transmitted by the modem 10 and can be eliminated using a finite impulse response (FIR) filter.

The echo 19, returning from the far end boundary 16, as a result of a transmission from the transmitter of modem 10, also adds to and distorts the signal received at modem 10 from the transmitter of modem 12, but, unlike the near end echo, is subject to both frequency and phase variations. The far end echo 19 also has a small signal energy relative to that of the received signal.

Figure 2:
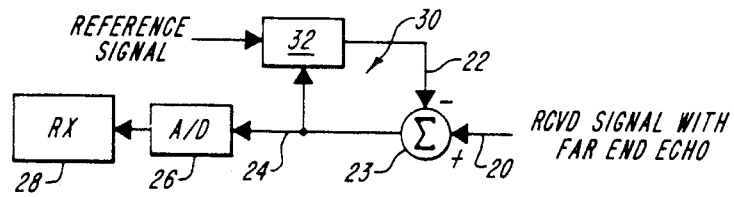
FIG. 2 is a simplified block diagram of a typical error compensation method according to prior art methods.

In a previous solution to the far end echo cancellation problem, referring to FIG. 2, the received signal over a line 20 (which signal includes the far end echo), is added or summed with an echo cancellation signal over a line 22 in an adder circuitry 23 to produce a resulting corrected received signal over a line 24. That corrected signal is converted to a digital signal in an analog-to-digital (A/D) converter 26 for processing by a receiver circuitry 28. The signal over line 24 is also employed, typically, to update the coefficients of an adaptive filter 32 which generates, from a reference signal, the echo cancellation signal over line 22.

The corrected received signal over line 24, however, has a large "real receiver" signal (corresponding to the signal from the remote transmitter) and a relatively small error signal. The relatively large receiver signal, to a large extent, masks the true error signal, that is, the remaining far end echo noise present on the line 24. As a result, the cancellation of the far end echo signal is not satisfactory when fast, accurate adaptation is required. Performance would be substantially improved if the real receiver signal could be removed so that only the noise error signal were employed in connection with the feedback system. It is this goal to which the present invention is directed.

In a typical transmission and receiving system which uses, for example, quadrature detection, each signal is represented in a two-dimensional space having, as is well known in the art, Q and I components. A typical receiver estimates, for a received signal having component values Q' and I', the location of the nearest true receiver signal. ("Nearest" in this context need not be nearest in distance, depending upon the particular estimation and detection method used.)

Figure 2A:
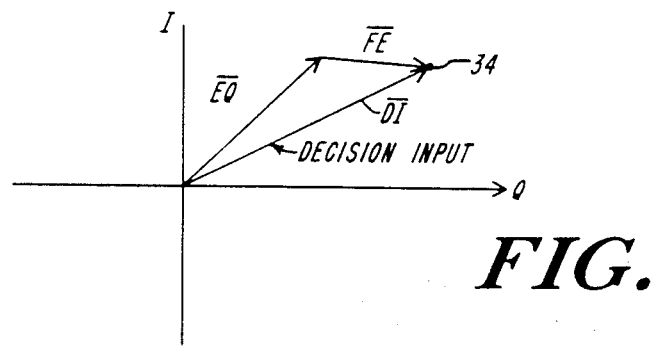
FIG. 2A is a vector diagram illustrating the components of a signal input to the decision circuitry.
Figure 2B:
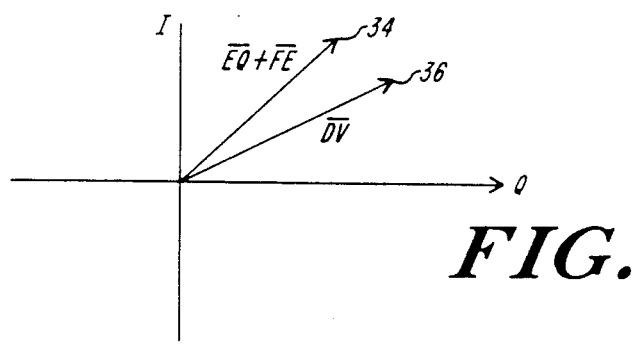
FIG. 2B is a vector diagram illustrating the method for determining the far end echo cancellation signal vector correction from the decision input signal and the receiver decision vector.

Referring to FIG. 2A, and using a vector notation, consider a receiver decision input over line 24 of FIG. 2, represented by a point 34. The vector quantity $\overline{DI}$, designating the decision input, can be and is composed of two input vectors. The first is an equalization output vector from an equalization circuitry and is designated $\overline{EQ}$; and the second is the far end echo cancellation vector, designated $\overline{FE}$, from an echo cancellation circuitry. The equalization circuitry output vector includes an equalized receiver signal component, corresponding to the uncorrupted receiver input signal, and an equalized far end echo component corresponding to the received far end echo signal. The echo cancellation signal, according to the invention, cancels the equalized far end echo received signal. The sum of the $\overline{EQ}$ and $\overline{FE}$ vectors results in the received data point 34. The object of the present invention is to generate the echo cancellation vector $\overline{FE}$. Turning now to FIG. 2B, the decision vector, corresponding to a point 36 and designated by vector $\overline{DV}$, represents the receiver's best estimate of the originally transmitted signal. The sum of the $\overline{EQ}$ and $\overline{FE}$ vectors corresponds to point 34. Point 34 is thus within the decision region of a transmitter signal designated by point 36. The object of the circuitry being described herein is then to provide a vector correction, which assumes that the vector $\overline{DV}$ is correct, to move the point 34 onto point 36. Accordingly, the vector from point 34 to point 36 defines a far end echo canceler correction vector which can be employed to update the echo canceler coefficients. The stochastic gradient update, familiar to those in the field, can be employed here. Alternatively, more rapidly converging methods, well known to those practiced in the field, can be used.

In accordance with the present invention, the far-end echo cancellation circuitry is positioned to operate in parallel with the receiver equalization circuitry of receiver circuitry 28. Thus, referring to FIG. 3, the echo cancellation process and the implementation hardware are moved from a position prior to the equalization process, to a position where the cancellation process is performed in parallel therewith. Preferably, the equalization process includes, as noted above, quadrature detection, with equalization, which is implemented, as is well known in the art, by a detection and equalization circuitry 40. The incoming received signal over a line 42, (corresponding to the signal over line 20 (FIG. 2)), includes both the real receiver signal and the far end echo signal, and passes through a series of buffer delays 44 which, in this illustrated embodiment, include quadrature separation elements. As is well known in the art, the outputs of the quadrature separation elements included in delays 44 are multiplied by respective equalization coefficients, the values of which are adjusted using feedback from a receiver decision circuitry 46, and are summed in circuitries 47a, 47b to provide a Q and an I signal component, over lines 61a, 61b, respectively. The I and Q signal components pass through a phase lock loop rotation element 48 (also controlled by feedback from receiver decision circuitry 46) and the outputs of element 48, the I and Q equalized receiver signals on lines 62a, 62b, are then applied (after echo cancellation as described below) to the decision circuitry 46 for determination of the "real received signal" (the receiver decision over a line 49) in accordance with the particular coding method being employed.

In accordance with the invention, the I and Q equalized receiver signals of the quadrature detection circuitry are summed, respectively, with I and Q echo cancellation signals from a far end echo cancellation circuitry 50. In the illustrated embodiment, the summing step takes place at the last possible location before application to the decision circuitry which, for this embodiment, in effect forms the beginning of the decision process circuitry. (In another embodiment, the summing step can take place just prior to phase rotation in phase locked loop rotation element 48.) In this illustrated embodiment, the rotation effected by loop 52 must compensate also for rotation by loop 48. The echo cancellation circuitry 50 operates to generate Q and I far end echo cancellation signals from a phase locked loop rotation element 52 over lines 54 and 56 respectively. The Q and I echo cancellation signals over lines 54 and 56 are applied to summation elements 58 and 60, respectively. The outputs of the summation elements 58, 60, the compensated I and Q equalized signals, are applied to the decision circuitry 46 over lines 48a, 48b. The echo cancellation signals over lines 54 and 56, generated in this illustrated embodiment by filtering a reference signal over a line 70 and then rotating the filtered output (an unrotated I and Q canceler signal) using rotation element 52, minimize and preferably completely cancel the far end echo signal component in the Q and I equalized receiver signals over lines 62a, 62b. The echo cancellation signals 54 and 56 are generated using I and Q coefficient update signals and a filter rotation error update signal developed, as described above, by the threshold detection circuitry 46, and applied over lines 62, 64, and 65.

The echo cancellation circuitry 50 implements an adaptive filter (a linear combination circuitry for summing a weighted sequence of values of the reference signal) employing a plurality of delay elements 65 arranged in a delay line, and multipliers 67. The outputs of the multipliers are applied to summation elements 68. The signals over lines 62, 64 are generated by a coefficient update control circuit 65a within decision circuitry 46. Those signals, after rotation by a rotation circuitry 53 which inverts the rotation of phase locked loop 52, operate to update, if necessary, the coefficients of multipliers 67. The reference signal, available over line 70 as described hereinafter, is applied as the signal input to the delay line of circuitry 50.

The rotation error update signal over line 65, generated by a rotation control circuit 65b within decision circuitry 46, controls operation of phase locked loop rotation element 52.

Figure 2C:
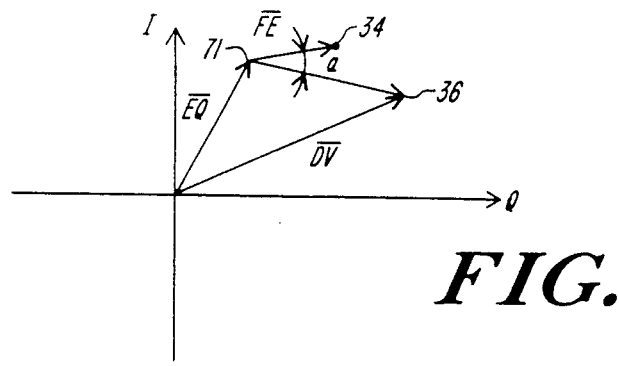
FIG. 2C is a vector diagram illustrating the method for determining the far end echo rotation update signal.

Referring to FIG. 2C, the rotation error update signal over line 65 is generated by superimposing the vector diagrams of FIGS. 2A and 2B and thereafter drawing a vector from the end of vector $\overline{EQ}$ (designated by point 71) to the end of vector $\overline{DV}$, point 36. This vector represents the best estimate of the echo cancellation signal to move point 71 onto point 36, and the angle "a" represents the rotation to be applied to the vector $\overline{FE}$ to align it with the vector from point 71 to point 36. (The implicit assumption is that vector $\overline{EQ}$ is correct.) The value and direction of the correction angle "a" generates the rotation error update signal over line 65. (By a similar process, wherein the vector $\overline{FE}$ is assumed correct, the rotation error update signal to rotation filter element 48, and the coefficient update signals to multipliers 67a are generated, as is well known in the art.)

The update values over lines 62, 64, and 65 are thus determined and adjusted using information data feedback from the decision generated by the decision circuitry 46. Importantly, as noted above, the far end echo cancellation correction circuitry 50 adds its output to the received signals after initial processing and just prior to the decision making, typically a threshold, process of circuitry 46. This allows the far end echo cancellation coefficient values and its phase locked loop's phase and frequency values to be adjusted using decision error feedback from the decision circuitry in a manner analogous to that for adjusting equalization coefficient values and the equalizer's phase locked loop rotation element 48 parameters. Thus the circuitry 50 operates to multiply samples of the reference signal 70 by coefficient values set by the signals over lines 62 and 64, the resulting products being summed for producing the unrotated I and Q error canceler signals over lines 69a, 69b. (The circuit thus operates in the same fashion as equalization circuitry 40.) The rotation control signal over line 65 controls the phase and frequency of the resulting echo cancellation signals over lines 54 and 56 from rotation element 52.

SYNCHRONIZATION

As noted above, the echo noise signal added to the received signal at boundary 16 (FIG. 1) results from the transmitted output of the local transmitter Tx of modem 10. Accordingly, the transmitted output of modem 10 is used as a reference signal (over line 70 of FIG. 3). Unfortunately, however, even though the transmitters of the various modem devices are crystal controlled to operate within a very small frequency range, it is unlikely that any two transmitters will operate synchronously in frequency. As a result, therefore, since the error correction system operates in the digital time domain at a sampling frequency synchronized to a clock derived from the incoming receiver signal, the transmitter frequency of the reference signal (the transmitter clock frequency) will beat against the frequency of the received signal and produce undesirable results.

Figure 4:
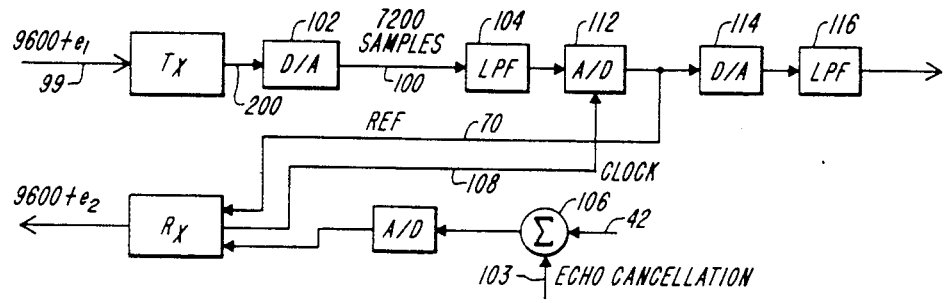
FIG. 4 is a schematic block diagram of one particular apparatus for generating the reference signal employed by the far end echo cancellation circuitry.

Thus, according to a particular embodiment of the invention, and referring now to FIG. 4, the sampling instants of the reference signal over line 70 must be synchronized in frequency to the recovered clock of the received signal on line 42. Considering first the operation of transmitter Tx, each modem transmitter receives an input signal over a line 99 at a nominal 9,600 bits per second. In fact, the signal is somewhat different than 9,600 bits per second, for example 9,600+$e_1$ bits per second. The transmitter encodes that signal, converts it into an analog signal for transmission over the two-wire telephone line, and provides a signal which has, for example, 7,200 samples per second, a multiple of, for example, a 2,400 baud rate. This signal, appearing at a line 100, from a D/A converter 102, is typically the signal which will be transmitted to the receiver. The frequency of the transmitted signal, as well as the analog signal emanating from the transmitter itself, are immutable since the transmitter must operate and adhere to various operating standards including being capable of operating from an external clock at any stable frequency within a limited range.

Correspondingly, each receiver receives the signals coming from the line 42 and provides at its output, a signal having a 9,600 bit per second nominal frequency but an actual frequency somewhat removed therefrom (for example, 9,600+$e_2$ bits per second). In order to properly provide echo cancellation for the far end echo, illustrated at 19 (FIG. 1), the echo cancellation signal over a line 103 must have a clock frequency equal to the clock frequency of the received signal. And, preferably, the far end echo cancellation error signal is derived using the transmitted signal available as a reference, from D/A 102, on line 100; however, that transmitted signal has a different sampling rate than the received signal. This is an undesirable occurrence since it presents implementation problems and may degrade performance.

Figure 4A:
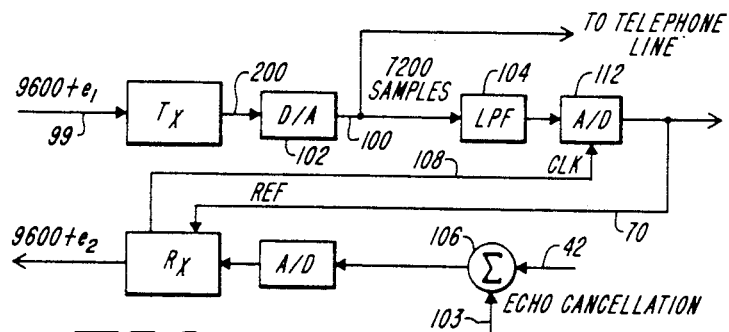
FIG. 4A is a schematic block diagram of a preferred analog implementation of apparatus for generating the reference signal employed by the far end echo cancellation circuitry.

According to an interpolation aspect of the invention, in one illustrated embodiment, the transmitted analog signal output over line 100 is interpolated to produce a sample signal having the correct sampling rate and phase. In accordance with one implementation of this feature of the invention, the analog output of the transmitter D/A over line 100 is low pass filtered by a filter 104 and is resampled at the receiver sample frequency (indicated by a clock signal on line 108). This sampled signal then becomes the reference signal over line 70 and is used by the receiver to produce an echo cancellation signal over line 103 to cancel the far end echo. The signal output of the sampling A/D converter 112, then, can be converted back to an analog signal by a digital-to-analog converter 114, low pass filtered by a filter 116, and transmitted over the two-wire telephone line. Preferably, in practice, as illustrated in FIG. 4A, the D/A converter 114 and filter 116 are not employed, and the output of D/A converter 102 is transmitted over the telephone line.

Figure 3:
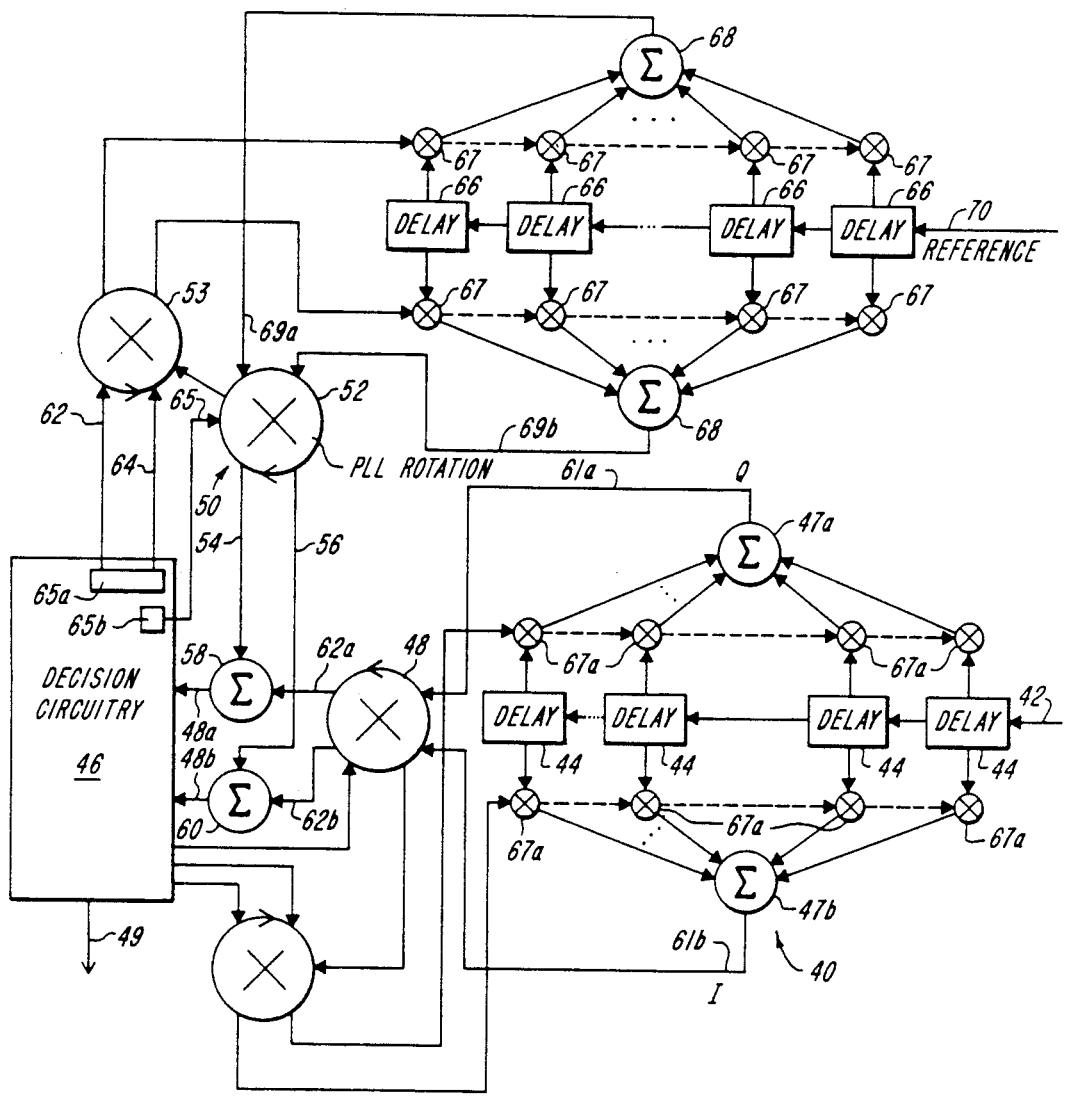
FIG. 3 is a schematic block diagram of a particular embodiment of the invention illustrating the generation and application of far end echo cancellation signals to a quadrature component receiver system.

While the sampling structures illustrated in FIGS. 4 and 4A adequately provide a synchronized reference signal to the receiver circuitry in accordance with the invention described in connection with FIG. 3, it is expensive and limiting to implement the filters and converters. This hardware introduces additional quantization noise and substantial hardware circuitry, as well as expense. Accordingly, in a preferred embodiment of the circuitry, a synchronized reference signal is provided purely in the digital time domain.

Figure 5:
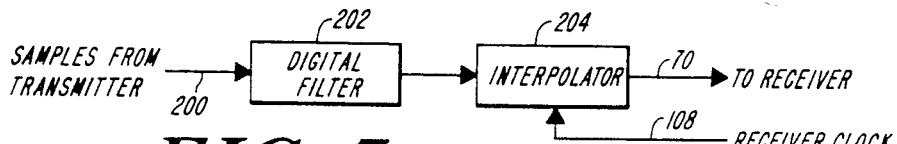
FIG. 5 is a schematic representation of an apparatus for generating the reference signal of FIG. 4 solely in the digital domain.

In general terms, referring to FIG. 5, the samples from the transmitter over line 200 can be, for example, at a sample rate of 7,200 hertz, and correspond to a baud rate of 2,400 hertz, that is, a sample rate equal to three times the baud rate. A digital filter 202 can be implemented, as described in more detail below, to low pass filter the sampled signal output from the transmitter over line 200 and, at the same time upsample, so that its output can occur at a new sample frequency which is, for example, an integer multiple of the old sample frequency such as sixteen times the original sample rate, or 115,200 hertz. The sampled output of the digital filter 202 is then interpolated (and down sampled), using an interpolator circuitry 204, to provide the receiver with a precise and synchronized output which is in phase with, and at the frequency of, the receiver sampling clock available over line 108.

The output from digital filter 202 need not be generated for each upsampled clock pulse. Whether the implementation is solely in hardware, software, or a combination of the two, only those sampled outputs from digital filter 202 which are required for interpolation, in order to match the phase and frequency of the receiver clock, need be provided. This is discussed in more detail below. Similarly, both the digital filter 202 and the interpolator circuitry 204, functioning as described hereinafter, can be implemented in hardware or software as is well within the skill of those in this field.

Figure 6:
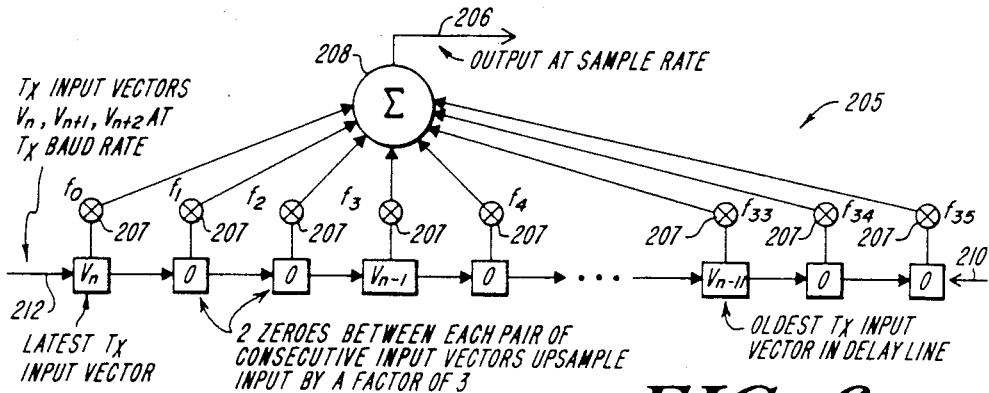
FIG. 6 is a typical finite impulse response (FIR) filter for upsampling the input signal at the baud rate to a sampled signal having a greater sampling rate.

To understand the operation and implementation of the circuitry in FIG. 5, and referring to FIG. 6, consider first a conventional transmit filter 205, an FIR filter, wherein the output over a line 206, at a sample rate S, is formed by summing the outputs of each of a plurality of multipliers 207 in a summing circuitry 208. The input parameters for each multiplier are one of a set of coefficients $f_0, f_1, \ldots f_{35}$, and a corresponding value $v_i$ of an input vector V defined at each of thirty-six positions along a delay line 210. The input values $v_i$ of the vector input V and the coefficients $f_i$ can be either scalars or complex variables depending upon whether the modulation is pulse amplitude modulation (PAM) or quadrature amplitude modulation (QAM), and upon whether the implementation provides for a passband or baseband filter. The value of the filter coefficients further depends upon whether there is any delay or other compensation built into the filter. The span of the thirty-six tap filter illustrated in FIG. 6 is twelve bauds, but it may be more or less than that. The sample rate of this filter is three times the baud rate, but any sample rate greater than twice the frequency of the highest frequency component of the transmit signal spectrum can be employed.

In accordance with this illustrated embodiment, the input from the transmitter is applied over a line 212 at the baud rate and the output for this embodiment is three times the baud rate. For example, if the baud rate is 2,400 hertz, the output is at 7,200 hertz. The input data stream is upsampled to 7,200 hertz by placing two zeroes between each baud input and the input, with the zeros therebetween, is sequenced through the delay line at the sample rate of 7,200 hertz. At each sample time, an output value is generated over line 206.

Figure 7:
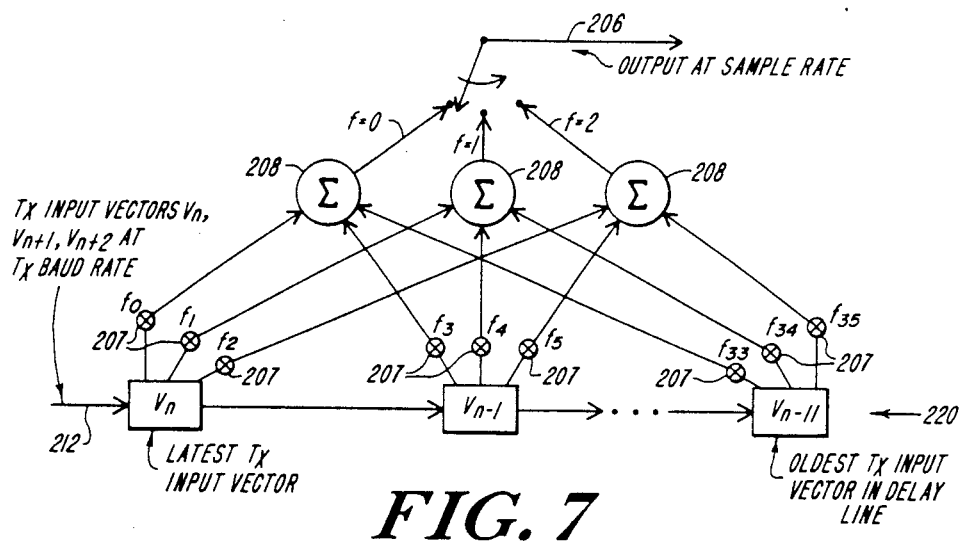
FIG. 7 illustrates an alternate implementation of the filter of FIG. 6.

Referring to FIG. 7, in an alternate embodiment of the FIR filter, the delay line 210 is substantially reduced by a factor, in this illustrated embodiment, of three, resulting in only twelve delay elements in a new delay line 220. In place of the longer delay line of FIG. 6, the number of summing circuitries 208 is increased and the apparatus switches in synchronism to movement of data through the delay line between the various summing circuitries as described below.

Referring to FIG. 7, the vector inputs $v_i$, and the coefficients $f_i$ are the same as those in FIG. 6. The filter structure, however, requires only one-third the multipliers 207 since the multiplication by zero does not occur. Thus, the filter of FIG. 7 can be considered as three different filters, each with its own set of filter coefficients: the set ($f_0, f_3, \ldots f_{33}$) corresponding to a variable f=0; the set ($f_1, f_4, \ldots f_{34}$) corresponding to f=1; and the set ($f_2, f_5, \ldots f_{35}$) corresponding to f=2. Thus, before every new sample is computed, the value of f is incremented by one. And, after that increment when f=2, the value of f is changed to zero (that is, f modulo 3). The input delay line 220 is sequenced before each output corresponding to each f=0 is determined. The delay line, however, is not sequenced as f changes from zero to one or from one to two.

(As is well known in the art, a unique continuous waveform having a maximum frequency of interest less than FS/2 can be associated with a sequence of numbers corresponding to a specified sampling frequency, FS, by passing the sequence of numbers through a digital-to-analog converter, at a converter sampling rate equal to FS and low pass filtering the output through an "ideal" low pass filter having a cutoff frequency equal to FS/2. One can then resample the resulting analog waveform using an A/D converter operating at the sampling rate FS. And, if the sampling phases are correctly aligned, the output of the analog-to-digital converter will be the original sequence of numbers. This is no more than the Nyquist sampling theorem. If the phases are not aligned, then the output sequence consists of "in between" samples. This corresponds in essence to operation of the circuitry identified by elements 102, 104 and 112 of FIG. 4.)

Referring to FIG. 4, if one needs to determine the values between samples but does not want to use a substantial quantity of analog circuitry, the analog low pass filter 104 can be built as a digital low pass filter (filter 202 of FIG. 5), and implemented as in FIGS. 6 or 7, with the time domain equivalent of low pass filtering, that is, convolving an input signal with the function (sin t)/t. Then, for example, one can upsample at sixteen times the old sample input rate by stuffing fifteen zeros between the existing samples (upsampling) and convolving the resulting upsampled sequence with a suitably truncated version of the ideal low pass filter whose ith coefficient is:

$$(\sin\pi(i-k)/16)/(\pi(i-k)/16) \quad \text{(Equation 1)}$$

The larger the value of k, the more ideal is the low pass filter. This filter function can also be implemented, of course, without performing any unnecessary multiplication by zero. The upsampling operation can be considered an implementation of an interpolation filter consisting of a low pass filter and a digital interpolator having sixteen new sample values per old sample value. One can then alternatively convolve the old transmit filter of FIGS. 6 or 7 with the interpolation filter defined by Equation 1 to create a new transmit filter 300 such as that illustrated in FIG. 8.

Figure 8:
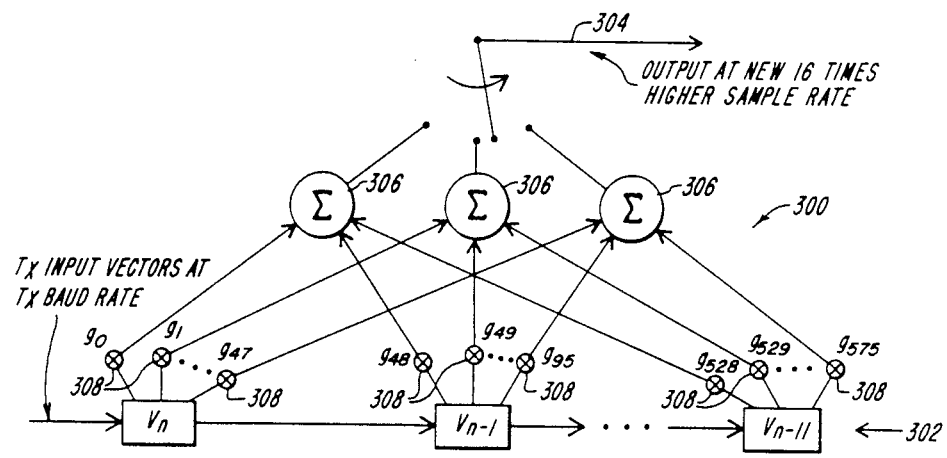
FIG. 8 illustrates the convolution of the filter of FIG. 7 with a digital low pass filter in accordance with a preferred embodiment of the invention.

Referring to FIG. 8, the new transmit filter produces forty-eight samples per transmit baud rather than the three samples per transmit baud of the filter of FIGS. 6 or 7. This new filter will also, like the filter of FIG. 7, be a truncated filter to limit the required computation. Then, if the input delay line 302 represents a twelve baud time duration, there will result a total of 576 coefficients, $g_i$. This number of coefficients results from the original thirty-six coefficients of the filter of FIGS. 6 and 7 times the sixteen phases which are now available from the filter of FIG. 8. The digital output of the digital interpolation filter 300 over line 304 can be fed to a digital-to-analog converter at 7,200×16, or 115,200 samples per second. The summation circuitries 306 and multipliers 308 correspond to the similar circuitries in FIG. 7. A higher sample rate output filter corresponding to filter 202 of FIG. 5 can thus also be implemented digitally, as illustrated in FIG. 8. The construction of the new transmit filter illustrated in FIG. 8 could be made to correspond to the structure illustrated in FIG. 6 wherein forty-seven zeros are added between adjacent baud inputs (instead of the two zeros of FIG. 6). Preferably, however, corresponding to the filter implementation of FIG. 7, the filter is implemented by replacing the three sets of filter coefficients $f_i$ with forty-eight sets of coefficients $g_j$. Thus, the set $(g_0, g_{48}, \ldots g_{528})$ corresponds to $j=0$; and the set $(g_j, g_{48+j}, \ldots g_{528+j})$ corresponds to the set j, where j ranges from 0–47. Depending upon the details of the interpolation filter and how it is indexed, and further upon how the truncation of the filter is performed, there may be, for example, three coefficient sets, for example $j=8$, $j=24$, and $j=40$, for which the coefficients are identical to the coefficients in the coefficient sets illustrated in FIG. 7. This filter is operated by incrementing j by one modulo 48 before each new sample is computed. When j wraps around from 47 to 0, the input line is sequenced before the new output is determined. Thus, the new filter corresponds to the filter of FIG. 7 except that its output sampling rate is sixteen times higher than the sampling rate of the filter of FIG. 7.

If the desired output of the filter illustrated in FIG. 8 were 7,200 samples per second (as required by the receiver reference signal over line 70), j could be increased by sixteen modulo 48 each new sample time while still sequencing the delay line each time j wraps around (past "47"). Thus, for $j=8, 24, 40, 8, 24, 40, \ldots$, the samples produced will be identical to those of FIG. 7 if the coefficient sets were identical. If j instead sequenced from 9 to 25 to 41, the only difference would be in the group delay. Thus, the coefficients corresponding to $j=9, 25$, and 41 form a filter having an amplitude and relative delay response almost identical to that of the filter formed when $j=8, 24, 40$. The group delay is incremented by one-sixteenth of a sample for each increment of "j." (The amplitude and relative delay responses would be exactly identical if it were not that the filter had to be truncated thereby making perfect suppression in the stop band unachievable.)

Having now described generally an FIR filter wherein arbitrarily high upsampling can be attained, the use of that filter to generate the required reference signal for the modem receiver will be described. As noted above, the receiving modem will track and synchronize to the frequency and phase of the incoming signal. If the receiver were not synchronized to the incoming signal, it is clear that an occasional bit error could occur, that is, a bit would have to be repeated or omitted. However, the failure of the receiver to track the exact frequency and phase of the incoming signal will have much more catastrophic consequences than merely a bit error since the receiver filter or equalizer 40 (FIG. 3) must be synchronized to the baud rate of the transmitting modem. And, therefore, in normal modem operation, the receiver bit and baud rates are adjusted automatically by the timing recovery circuit in the receiver to make it run at exactly the same speed as the transmitter of the modem producing the signal which it is receiving.

While the receiver "tracks" the frequency and phase of the incoming data signal, it uses its own master clock to operate its circuitry. Even under these conditions, where the receiver clock is not synchronous in phase or frequency to the data clock, it is convenient to preserve the exact integer relationship between the baud rate and the sample rate. This can be achieved by occasionally making the receiver sample duration a few master clock cycles shorter or longer than nominal, thereby lengthening or shortening a baud interval as well. Accordingly, to track the transmitter of another modem, a receiver occasionally can make its samples 15/16 or 17/16 as long as they typically are. That is, the receiver samples are 15/16 or 17/16 as long as the samples which its own transmitter is putting out over the line.

In practice the adjustments are much finer than this but for purposes of explanation, consider the change of sample size on the order of 1/16 of a sample. If, to effect echo cancellation at the modem receiver, the equipment attempted to provide, at the reference input over line 70 exactly one transmit sample for each receiver sample, then if the transmit signal and the received signal baud rates differed, occasionally, a receiver sample time different than nominal (for example, 1/16 of a sample cycle as illustrated above) would require adjustment of the transmit sample time by the same amount. In normal operation, this adjustment cannot be performed very often before either an underflow or overflow either of the transmitter vector buffers or of the transmitter computational buffers occurs. That is, eventually, data would either overflow the buffers or the buffer would be empty. Also, each time the transmit sample time was changed by 1/16 of a sample duration, the group delay of the transmitter is also changed by that amount. However, using the filter of FIG. 8, and noting that the parameter "j" for the filter can be changed each time the sample duration is changed, it can be understood that the transmitter's original group delay can thus be preserved. Thus the filter of FIG. 8 provides a digital domain implementation which allows generation of a reference signal synchronized in phase and frequency to the received signal.

For example, assume that the digital-to-analog conversion rate is about 7,200 hertz, or exactly three times the receiver baud rate, and that to start a sample, j equals eight. To obtain the next j and thus index to a new coefficient set, j is nominally incremented by sixteen modulo 48. Thus the next coefficient set is twenty-four. Since j did not wrap around, the input delay line is not sequenced before computing the next sample output. If the sample time were 15/16 of a normal sample or 15/48 of a transmitter baud duration, then j would be incremented by only fifteen instead of sixteen, corresponding to the twenty-third coefficient set.

If, on the other hand, j started at a value equal to thirty-two, then when j is incremented by fifteen rather than sixteen, the new value of j would be forty-seven and would not wrap around so that the wrap around time would be delayed by one sample value, as would sequencing of the delay line. Thus, four samples are derived without sequencing the transmitter delay line. This corresponds to the fact that the receiver samples, and accordingly now the transmitter samples, are coming more frequently, although only slightly more frequently, than three times the baud rate. The transmitter filter is receiving, on average, fewer inputs than usual for each output so that the inputs must each remain slightly longer per sample interval. If there were no long samples, and on average a short sample occurred once every 100 sample times, then on average, once every 1,600 samples there would be four consecutive samples without sequencing the transmitter input delay line.

Correspondingly, if the receiver baud rate is less than the transmitter baud rate, j will occasionally be incremented by seventeen (instead of sixteen) and eventually there will be a sequence wherein only two samples occurred between sequencing of the input delay line.

Thus, on average, transmitter baud vectors, and the bits from which they are formed, are being taken from the transmitter buffer at the rate that they are coming in. Thus the transmitter sample rate can be synchronized to the receiver sample rate, even if the transmitter baud rate differs from the receiver baud rate, and without having to incur any lost or repeated bits.

As noted above, it is important to recognize that, in a practical and preferred embodiment, it is not necessary to calculate every one of the upsampled values. Only those values necessary to generate the receiver reference samples need be calculated.

Changing the duration of the analog-to-digital sample interval disturbs the operation of the receiver as does the failure to promptly adjust the receiver for gradually accumulating changes of phase between the other modem's transmitter and the local modem's receiver baud clock. Also, changing the duration of the transmitter's digital-to-analog sample interval disturbs the receiver of the modem to which it is transmitted. It is therefore preferable to make the adjustment size as small as possible without being so small that continually applied adjustments in one direction cannot compensate for the maximum permissible clock offset in the system. It therefore results that a good adjustment size is less than 1/48 of a baud period. The coefficient storage requirement has already been increased by a factor of sixteen, to 576 coefficients (half that if the filter is symmetric and twice that number if it is complex and not symmetric) and it is undesirable to increase further the number of stored coefficients. However, it turns out that a sample rate of 7,200 × 16 provides a sufficiently high sampling rate that linear interpolation between adjacent coefficients or, exactly equivalently, between consecutive 115,200 hertz output samples, is a very good approximation to the ideal (sin t)/t filter. A precise measure of the distortion due to this approximation depends on the exact shape of the transmit filter.

Accordingly, referring to FIG. 5, and in a particular preferred embodiment of the invention, the filter 202, instead of using twelve multiply and accumulates per sample to produce the filter output, uses twenty-four multiply and accumulates to produce two output sample values, the two values corresponding to the two adjacent sample values between which interpolation can take place. Linear interpolation between these outputs achieves finely resolved control over the group delay of the transmit filter. The additional processing time required can be less expensive than the factor of ten or more increase in the ROM requirements where the increased resolution is achieved by increasing the number of coefficient values stored (in the ROM). The interpolator 204 then applies a linear interpolation to the adjacent output samples.

The resulting digital filter, corresponding to filter 104 and A/D converter 112 of FIG. 4, in a preferred and illustrated embodiment of the invention, will employ a master clock having a frequency of 40.320 megahertz (or 16,800 times the baud rate). An adjustment will correspond to four clock cycles, or about 100 nanoseconds. Exactly 16,800/4 or 4,200 adjustments will equal one baud period, and 1400 adjustments correspond to one sample. The filter will have a twelve baud extent with forty-eight coefficient sets, or interpolation phases, so that there will be required the 576 coefficients described above.

In this manner, a transmitter reference signal can be obtained in synchronism with the receiver signal using digital interpolation techniques without the requirement of additional low pass filtering and analog-to-digital and digital-to-analog conversions.

As noted above, it is important that not all sample outputs must be generated by the filter circuitry of, for example, FIG. 5. In particular, only those samples corresponding to receiver clock sample pulses need be provided by the interpolator so that, whether performed in hardware or software, substantial calculation need not be performed.

Figure 9:
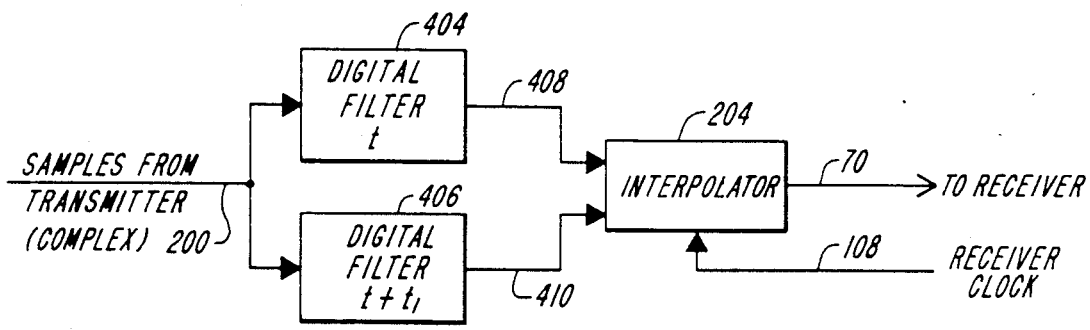
FIG. 9 is a schematic representation of an apparatus employing two digital filters for producing an interpolated sample output reference signal.
Figure 10:
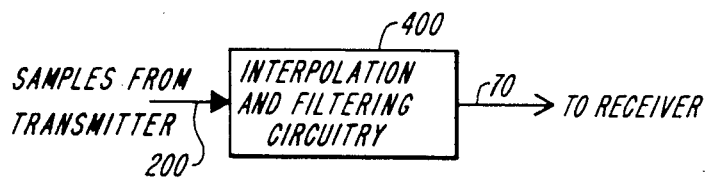
FIG. 10 is a schematic representation of an apparatus employing a combined filter and interpolation circuitry for producing an interpolated sample output reference signal.

In particular, referring to FIGS. 9 and 10, the filter 202 of FIG. 5 can be implemented in two alternative embodiments. In one embodiment, illustrated in FIG. 9, two separate digital filters 404, 406 are provided. According to a construction such as that illustrated in FIG. 8, each of those filters provides an upsampled output at a sample rate equal to, for example, 16×7,200 or 115,200 hertz output samples. The difference between the two filters is that their outputs, while synchronized to each other, are such that one filter lags the other by one sample cycle. The interpolator 204, corresponding to the same interpolator in FIG. 5, then has available to it, at each cycle, the two sample values over lines 408 and 410 from which the output sample value can be provided to the receiver in accordance with the receiver clock timing provided over line 108.

With respect to FIG. 10, the interpolation and filtering steps have been combined so that circuitry 400 performs both steps in one operation. The data from the digital filters can be conveniently and advantageously calculated in either hardware or software. Accordingly, for the preferred embodiment of FIG. 10, savings are achieved in the amount of calculation required to effect the interpolation and filtering process.

Figure 11:
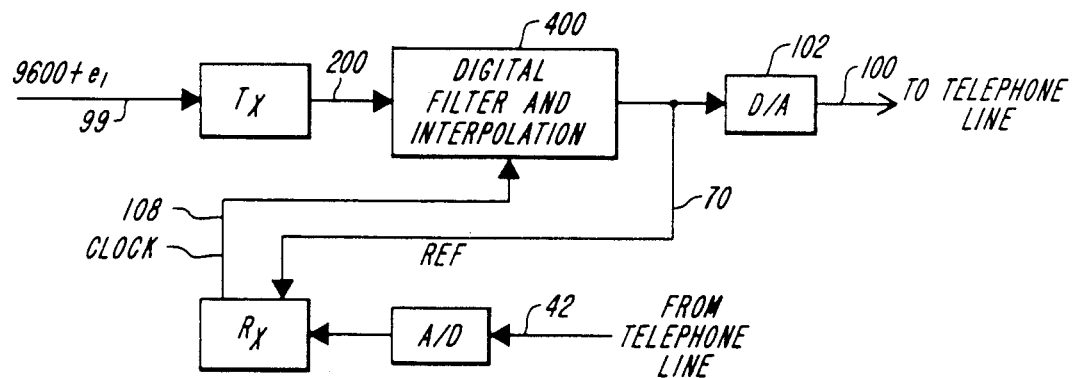
FIG. 11 is a schematic representation of the combined filter and interpolation circuitry in a complete data communications system.

Referring now to FIG. 11, the interpolation and filtering circuitry of FIG. 10 can be advantageously inserted into the data communications system of FIG. 4A between the transmitter Tx and the D/A converter 102. In accordance with this embodiment of the invention, the digital signal output of the transmitter Tx over lines 200 is applied to the digital filter and interpolation circuitry 400. Circuitry 400 also receives the receiver clock signal over line 108 from the receiver Rx. As noted above, the output of the circuitry 400 is the reference signal needed by the receiver circuitry and is available over line 70. In accordance with this embodiment of the invention, that same signal is applied to the digital-to-analog converter 102 for delivery to the telephone line over line 100. In accordance with this preferred embodiment of the invention, the clock timing of the output signal thus advantageously matches the clock timing of the received signal.

Additions, subtractions, deletions, and other modifications of the described particular preferred embodiments of the invention will be apparent to those practiced in the art and are within the scope of the following claims.

What is claimed is:

1. In a full duplex communications apparatus having at least two communicating modem stations, each station having a transmitter for placing transmit communications signals onto a two wire communications path, a receiver for receiving received communications signals from said communications path, and wherein each said received communications signal at a station has a noise-free signal component and a noise signal component, said noise signal component including a far end echo signal generated from said transmit signals of the station, apparatus for reducing the effect of the far end echo signal at the receiver comprising quadrature detection and equalization circuitry for generating from a said received signal an I and a Q equalized receiver signal, receiver decision circuitry responsive to a compensated I and Q equalized receiver signal for generating a receiver decision and for using the receiver decision for generating an I and a Q error update signal, far end echo compensation circuitry responsive to said I and Q error update signals and a reference signal from the transmitter of the station for generating an I and a Q far end echo cancellation signal, means for combining said I echo cancellation signal and said I equalized receiver signal for generating said compensated I equalized receiver signal for delivery to said receiver decision circuitry, and means for combining said Q echo cancellation signal and said Q equalized receiver signal for generating said compensated Q equalized receiver signal for delivery to said receiver decision circuitry.

2. The apparatus of claim 1 wherein said far end echo compensation circuitry comprises a linear combination circuitry responsive to said I and Q error update signals and said reference signal for generating an I and Q unrotated echo canceler output signal, a phase locked loop rotation circuit responsive to said I and Q unrotated canceler signals and to a rotation control update signal from the receiver decision circuitry for generating said I and Q far end echo cancellation signals, and means, at said receiver decision circuitry, responsive to said compensated I and Q equalized signals for computing the rotation control update signal.

3. The apparatus of claim 1 wherein said I combining means and said Q combining means comprise an I summation circuitry for generating said compensated I receiver signal equal to a sum of said I cancellation signal and said I equalized receiver signal for delivery to said decision circuitry, and a Q summation circuitry for generating said compensated Q receiver signal equal to a sum of said Q cancellation signal and said Q equalized receiver signal for delivery to said decision circuitry, and said detection and equalization circuitry further comprises a phase locked loop rotation circuitry for generating said I and Q equalized receiver signals from unrotated I and Q error equalized receiver signals in response to a rotation control signal from the receiver decision circuitry.

4. The apparatus of claim 1 further comprising synchronization and amplitude circuitry for generating said reference signal as an amplitude interpolated signal from said transmitter operating at a first clock rate, and synchronized to said receiver operating at a receiver clock rate different than the first clock rate, said receiver clock rate being synchronized to the received communications signals.

5. The apparatus of claim 4 wherein said synchronization and amplitude interpolation circuitry receives as its input discrete sample signals output by the transmitter at the baud rate of the transmitter, and has circuitry for providing said amplitude interpolated reference signal without converting the transmit signal to an analog signal and thereafter resampling a filtered version of the analog signal at the receiver clock rate.

6. The apparatus of claim 4 wherein said synchronization and interpolation circuitry comprises circuitry responsive to the receiver clock signal for digitally filtering and sampling a transmitter output signal at virtually any desired sampling phase or frequency corresponding to said clock signal for providing a sampled transmitter reference signal at a sample frequency corresponding to said receiver clock rate.

7. The apparatus of claim 6 wherein said synchronization and interpolation circuitry further comprises means for interpolating between sample outputs of said filtering and sampling circuitry for providing a sampled value of said transmit signal as the reference signal in substantial synchronization with a receiver clock sample signal.

8. The apparatus of claim 7 wherein said filtering and sampling circuitry comprises filter means having a span of at least twelve transmit baud periods.

9. The apparatus of claim 1 wherein said far end echo compensation circuitry comprises a linear combination circuitry responsive to rotation compensated I and Q error update signals and said reference signal for generating an I and Q unrotated echo canceler output signal, a phase locked loop rotation circuit responsive to said I and Q unrotated canceler signals and to a rotation control update signal from the receiver decision circuitry for generating said I and Q far end echo cancellation signals, an inverse rotation circuitry responsive to the phase locked loop rotation circuit for rotating the I and Q error update signals for providing said rotation compensated error update signals for updating said linear combination circuitry, and means, at said receiver decision circuitry, responsive to said compensated I and Q equalized signals for computing the rotation control update signal.

10. In a full duplex communications apparatus having at least two communicating modem stations, each station having a transmitter for placing transmit communications signals onto a two wire communications path, a receiver for receiving received communications signals from said communications path, and wherein each said received communications signal at a station has a noise-free signal component and a noise signal component, said noise signal component including a far end echo signal generated from said transmit signals of the station, apparatus for reducing the effect of the far end echo signal at the receiver comprising quadrature decision and equalization circuitry for generating from a said received signal an I and a Q equalized receiver signal, receiver decision circuitry responsive to a compensated I and Q equalized receiver signal for generating a receiver decision and an I and a Q error update signal, far end echo compensation circuitry for generating an I and a Q far end echo cancellation signal including a linear combination circuitry responsive to said I and Q error update signals and a reference signal for generating an I and a Q unrotated echo canceler output signal, a phase locked loop rotation circuit responsive to said I and Q unrotated canceler signals and to a rotation control update signal from the receiver decision circuitry for generating said I and Q far end echo cancellation signals, and means, at the receiver decision circuitry, responsive to said compensated I and Q equalized signals, said I and Q cancellation signals, and said receiver decision, for computing the rotation control update signal, an I summation circuitry for generating said compensated I receiver signal equal to a sum of said I cancellation signal and said I equalized receiver signal for delivery to said decision circuitry, a Q summation circuitry for generating said compensated Q receiver signal equal to a sum of said Q cancellation signal and said Q equalized receiver signal for delivery to said decision circuitry, a phase locked loop rotation circuitry for generating said I and Q equalized receiver signals from unrotated I and Q equalized receiver signals in response to a rotation control signal from the receiver decision circuitry, and synchronization circuitry for generating said reference signal from said transmitter operating at a first clock rate and synchronized to said receiver operating at a receiver clock rate different than the first clock rate, said receiver clock rate being synchronized to the received communications signals said synchronization circuitry including circuitry responsive to the receiver clock signal for digitally filtering and sampling a transmitter output signal corresponding to said transmit communications signal at a sample frequency corresponding to said receiver clock rate, and means for interpolating between sample outputs of said filtering and sampling circuitry for providing a sampled value of said transmit signal as the reference signal in substantial synchronization with a receiver clock sample signal.

11. In a full duplex communications apparatus having at least two communicating modem stations, each station having a transmitter for placing transmit communications signals onto a two wire communications path, a receiver for receiving received communications signals from said communications path, and wherein each said received communications signal at a station has a noise-free signal component and a noise signal component, said noise signal component including a far end echo signal generated from said transmit signals of the station, apparatus for reducing the effect of the far end echo signal at the receiver comprising quadrature decision and equalization circuitry for generating from a said received signal an I and a Q equalized receiver signal, receiver decision circuitry responsive to a compensated I and Q equalized receiver signal for generating a receiver decision and an I and a Q error update signal, far end echo compensation circuitry for generating an I and a Q far end echo cancellation signal including
- a linear combination circuitry responsive to rotation compensated I and Q error update signals and a reference signal for generating an I and a Q unrotated echo canceler output signal,
- a phase locked loop rotation circuit responsive to said I and Q unrotated canceler signals and to a rotation control update signal from the receiver decision circuitry for generating said I and Q far end echo cancellation signals,
- an inverse rotation circuitry responsive to the phase locked loop rotation circuit for rotating the I and Q error update signals for providing said rotation compensated error update signals for updating said linear combination circuitry, and
- means, at the receiver decision circuitry, responsive to said compensated I and Q equalized signals, said I and Q cancellation signals, and said receiver decision, for computing the rotation control update signal,
- an I summation circuitry for generating said compensated I receiver signal equal to a sum of said I cancellation signal and said I equalized receiver signal for delivery to said decision circuitry,
- a Q summation circuitry for generating said compensated Q receiver signal equal to a sum of said Q cancellation signal and said Q equalized receiver signal for delivery to said decision circuitry,
- a phase locked loop rotation circuitry for generating said I and Q equalized receiver signals from unrotated I and Q equalized receiver signals in response to a rotation control signal from the receiver decision circuitry, and
- synchronization circuitry for generating said reference signal from said transmitter operating at a first clock rate and synchronized to said receiver operating at a receiver clock rate different than the first clock rate, said receiver clock rate being synchronized to the received communications signals
said synchronization circuitry including
  - circuitry responsive to the receiver clock signal for digitally filtering and sampling a transmitter output signal corresponding to said transmit communications signal at a sample frequency corresponding to said receiver clock rate, and
  - means for interpolating between sample outputs of said filtering and sampling circuitry for providing a sampled value of said transmit signal as the reference signal in substantial synchronization with a receiver clock sample signal.

12. In a full duplex communications apparatus having at least two communicating modem stations, each station having
- a transmitter for placing transmit communications signals onto a two wire communications path,
- a receiver for receiving received communications signals from said communications path, and
- wherein each said received communications signal at a station has a noise-free signal component and a noise signal component, said noise signal component including a far end echo signal generated from said transmit signals of the station,
- a method for reducing the effect of the far end echo signal at the receiver comprising the steps of quadrature detecting and equalizing the received signals for generating from said received signals and I and a Q equalized receiver signal,
generating a receiver decision from a compensated I and Q equalized receiver signal,
generating an I and a Q error update signal using the receiver decision and the compensated I and Q equalized receiver signal,
generating an I and a Q far end echo cancellation signal in response to said I and Q error update signals and a reference signal from the transmitter of the station,
combining said I echo cancellation signal and said I equalized receiver signal for generating said compensated I equalized receiver signal for delivery to a receiver decision circuitry, and
combining said Q echo cancellation signal and said Q equalized receiver signal for generating said compensated Q equalized receiver signal for delivery to said receiver decision circuitry.

13. The method of claim 12 wherein said far end echo cancellation signal generating step comprises the steps of
- linearly combining samples of and said reference signal according to said I error update signal for generating an I linear combination output signal,
- linearly combining samples of said reference signal according to said Q error update signal for generating a Q linear combination output signal,
- rotating said I and Q linear combination signals in response to a phase error correction signal driving a phase rotation circuit for generating said I and Q far end echo cancellation signals, and
- generating the phase error correction for the next baud in response to the compensated I and Q equalized receiver signals, the rotated cancellation signals, and a receiver decision.

14. The method of claim 12 wherein said I combining step and said Q combining step comprise the steps of
- generating the sum of said I cancellation signal and said I equalized receiver signal,
- generating the sum of said Q cancellation signal and said Q equalized receiver signal, and
- generating said I and Q equalized receiver signals, using a phase locked loop rotation circuitry, in response to a rotation control signal from the receiver decision circuitry.

15. The method of claim 12 further comprising the step of
generating said reference signal as an amplitude interpolated signal from said transmitter operating at a first clock rate, and synchronized to said receiver operating at a receiver clock rate different than the first clock rate, said receiver clock rate being synchronized to the received communications signals.

16. The method of claim 15 wherein said interpolated reference signal generating step comprises the step of
digitally filtering and sampling a transmitter output signal at virtually any desired sampling phase or frequency corresponding to said clock signal for providing a sampled transmitter reference signal at a sample frequency corresponding to said receiver clock rate.

17. The method of claim 16 wherein said generating step further comprises the step of
interpolating between sample outputs from said filtering and sampling step for providing a sampled value of said transmit signal in substantial synchronization with said receiver clock signal.

18. The method of claim 17 wherein said filtering and sampling step comprises the step of
providing a filter span extending over at least twelve transmit baud periods.

19. In a full duplex communications apparatus having at least two communicating modem stations, each station having
a transmitter for placing transmit communications signals onto a two wire communications path,
a receiver for receiving received communications signals from said communications path, and
wherein each said received communications signal at a station has a noise-free signal component and a noise signal component, said noise signal component including a far end echo signal generated from said transmit signals of the station,
a method for reducing the effect of the far end echo signal at the receiver comprising the steps of
quadrature detecting and equalizing the received signals for generating from said received signals an I and a Q equalized receiver signal,
generating a receiver decision and an I and a Q error update signal from a compensated I and Q equalized receiver signal,
linearly combining samples of said reference signal according to said I error update signal for generating an I linear combination output signal,
linearly combining samples of said reference signal according to said Q error update signal for generating a Q linear combination output signal,
rotating said I and Q linear combination signals in response to a phase error correction signal from a receiver decision step for generating said I and Q far end echo cancellation signals,
generating said phase error correction for the next baud in response to the compensated I and Q equalized receiver signals, the rotated cancellation signals, and a receiver decision,
generating the sum of said I cancellation signal and said I equalized receiver signal,
generating the sum of said Q cancellation signal and said Q equalized receiver signal,
generating said I and Q equalized receiver signals, using a phase locked loop rotation circuitry, in response to a rotation control signal from said receiver decision step, and
generating said reference signal from said transmitter operating at a first clock rate, and synchronized to said receiver operating at a receiver clock rate different than the first clock rate, said receiver clock rate being synchronized to the received communications signals, said reference signal generating step comprises the step of
digitally filtering and sampling a transmitter output signal at a varying sampling phase and frequency corresponding to said clock signals for providing a sampled transmitter reference signal at a sample frequency corresponding to said receiver clock rate, and
interpolating between sample outputs from said filtering and sampling step for providing a sampled value of said transmit signal in substantial synchronization with said receiver clock signal.

* * * * *